United States Patent Office 3,056,467
Patented Oct. 2, 1962

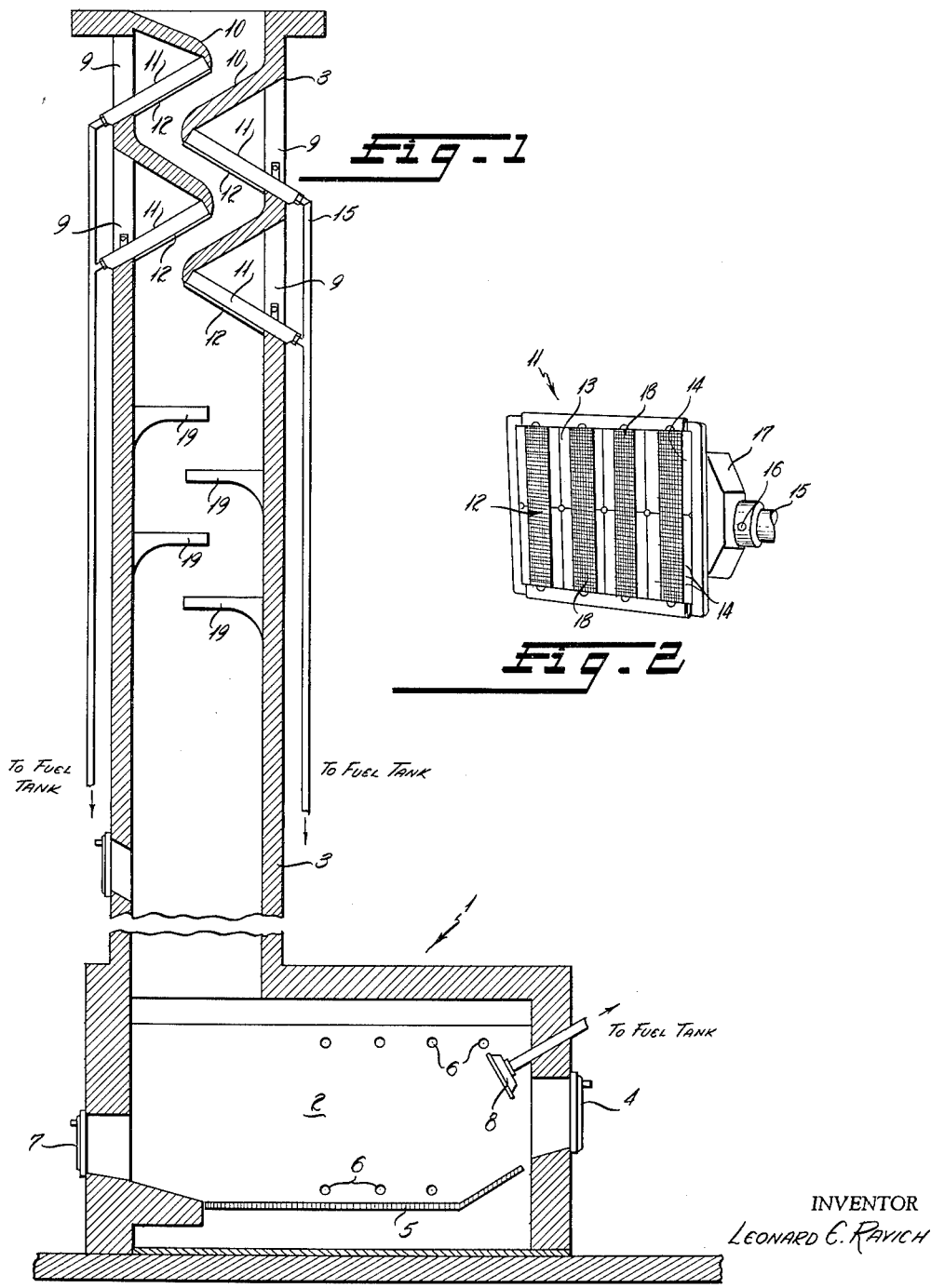

3,056,467
METHODS AND APPARATUS FOR CONTROL OF COMBUSTION PRODUCTS
Leonard E. Ravich, Cleveland Heights, Ohio, assignor to Hupp Corporation, Cleveland, Ohio, a corporation of Virginia
Filed Feb. 21, 1958, Ser. No. 716,677
5 Claims. (Cl. 23—277)

This invention relates to the methods and apparatus for the control of products of combustion. More particularly the invention relates to the control and elimination of noxious combustible smoke, fumes and combustible particles suspended in the products of combustion emitted from incinerators, flues, chimneys and the like.

The abatement of such noxious fumes and smokes ensuing from incinerators and various industrial processes involving combustion has long been a serious problem, particularly in heavily populated and industrial areas. Much effort has been expended in devising a number of various systems, many of which are patented, in attempts to solve the problem of disposing of them in a manner to minimize or eliminate nuisance and health hazards resulting therefrom. Two of the most common systems used heretofore in converting such combustible materials into less objectionable form have been stack afterburners and catalytic fume burners, both of which have certain inherent physical and chemical limitations.

One of the most serious difficulties with the afterburners used heretofore is that they do not produce sufficiently high temperatures to ignite and completely burn many of the combustible products passing through the stack and they are thus dicharged into the atmosphere still in noxious and objectionable form. Further, most stack afterburners depend upon air in the stack products of combustion to support afterburning and this air supply is often insufficient for economical and effective operation. Also, the afterburning jets frequently become clogged with stack and fuel residues requiring frequent cleaning and costly maintenance.

Some catalytic fume burners have found widespread acceptance in the trade, but their use is limited to the burning of combustible materials that are in a vapor phase or capable of being vaporized at a reasonable temperature. Catalytic fume burners operate on the principle of catalytic oxidation, which described broadly, proceeds through the following three steps: (1) adsorption of the substance to be oxidized on the catalytically active surface, (2) chemical reaction, and (3) desorption. Details of the mechanism of catalytic oxidation are described in "Range of Applicability of Catalytic Fume Burners" by H. R. Suter, Volume 5, Number 3, November 1955; The Journal of the Air Polution Control Association.

In one arrangement, a catalytic fume burner comprises a closely packed mat of narrow, heat- and corrosion-resistant metallic ribbon, crimped so as to provide a maximum surface area. A combination of metals of the platinum group is applied to all surfaces of the mat, and conditioned to produce catalytic activity in the oxidation of hot combustible fumes that are passed thereover. The presence of foreign substances in the combustible fumes even in minor amounts often exerts a powerful retarding or poisoning influence on the oxidation speed of such catalytic burners owing to their preferential adsorption on the ribbon surfaces. When poisoning of the catalytic surface has built up to a point where the catalytic fume burner is rendered ineffective, the catalytic surfaces must be discarded, restored or reactivated by special processes which are of course known to be time-consuming and expensive.

A primary object of this invention is therefore to provide efficient, low cost catalytic combustion methods and apparatus for flues and stacks of incinerators, burners and the like, which are not subject to poisoning from foreign materials in the flue stream and are self-cleaning for the operative life of the burner.

Another object is to provide a novel catalytic combustion burner for such flues and stacks that will substantially completely burn noxious combustible fumes and particles passing therethrough to render them innoxious before they are discharged into the atmosphere.

Still another object of this invention is to provide a novel method and apparatus for catalytic combustion of noxious combustible fumes and particles by contact with a surface capable of supporting catalytic combustion comprising a substantially flameless surface combustion of fuel which emits intense infra-red radiant energy.

Other objects and advantages of the invention will become apparent from the following detailed description and drawing, in which:

FIGURE 1 is a transverse sectional view of an incinerator assembly incorporating a preferred arrangement of catalytic combustion burners; and FIGURE 2 is a perspective view of a suitable catalytic combustion burner for use in this invention.

This basic concept of this invention comprises utilization of a catalytic combustion surface for inducing and causing complete burning of combustible materials passed through flues, stacks and the like. The catalytic surface may comprise a perforated, porous refractory plate which carries a substantially flameless surface combustion on the face thereof, the surface combustion being supported independently of air from inside the flue. Other types of surfaces capable of supporting combustion may also be employed. They include: (1) a properly supported layer of granulated refractory material; (2) a diaphragm of bonded grannular material; (3) a perforated ceramic plate. The face of the refractory plate is heated by the substantially flameless surface combustion to a temperature of from 1500–1650° F. and higher to emit intensive infra-red heat energy. While this basic concept of the invention may be embodied in any system wherein it is desired to burn a fluid gaseous flue stream of combustible materials and particles suspended therein, it will be described in connection with a conventional type incinerator illustrative of a typical application.

Referring now more specifically to the drawing, FIGURE 1 illustrates a conventional incinerator indicated generally at 1 having a combustion chamber 2 which leads to a chimney stack or flue indicated generally at 3 of rectangular cross-section. The incinerator 1 has a charging door 4, a grate 5, air ports 6, and a clean-out door 7. The incinerator 1 also has a 100% primary air burner 8 capable of supporting catalytic surface combustion to assist in the ignition and/or combustion of damp materials or materials that are difficult to incinerate. Partially burned gaseous and smoke particles from refuse that is burned in combustion chamber 2 pass up the flue 3 and if without complete combustion are free to pollute the atmosphere over wide areas.

To effect complete combustion prior to discharge in accordance with the present invention, flue 3 is provided adjacent its outlet end and through a pair of opposite sides thereof with a plurality of relatively staggered opposite openings 9 as illustrated. The top of each opening is provided with a downwardly inclined heat insulating ledge or shield 10 which may form an integral part of the flue 3. Mounted in each of the openings 9 is a catalytic combustion burner indicated generally at 11 which is upwardly inclined to provide a catalytic combustion surface 12 in the flue. The upper ends of burners 11 are supported in the lower ends of the adjacent shields 10. Suitable means such as a refractory cement or asbestos gasket is used to seal the sides of burner 11 with the edges of openings 9, shields 10, and the inside of flue 3 so that none of the flue stream can escape before being discharged at the outlet end of the flue.

The positioning, mounting and alignment of catalytic combustion surfaces 12 as shown are merely illustrative of one of many arrangements that may be used and the number of surfaces used may be varied in accordance with the amount and nature of combustible materials passing up the flue. In the embodiment shown, the flue stream of products of partial combustion passing through flue 3 travel a tortuous path and the combustible components in the flue stream wipe across the catalytic combustion surfaces 12 on the face of burners 11 and through a zone of intensive infra-red heat energy whereby they are ignited and completely oxidized or burned.

A preferred catalytic combustion surface 12 of this invention comprises a porous refractory plate having about 200 tiny perforations therethrough per square inch. When the plate is heated to operating temperatures the combustion takes place within the perforations and adjacent the surface of the refractory plate to provide a substantially flameless surface combustion preferably with an excess of air which heats the surface of the refractory plate to a temperature of from 1500°–1650° F. and higher to emit intensive infra-red heat energy.

While any porous catalytic refractory surface which will provide a substantially flameless surface combustion, emit intensive infra-red radiant heat, and have a surface temperature as specified may be utilized, it is preferred that the catalytic surfaces 12 be provided by gas burners of the type described and claimed in U.S. Patent No. 2,775,294 of Guenther Schwank. Such burners are available on the market under the trade name of "Perfection" and are manufactured by Perfection Industries of Cleveland, Ohio.

FIGURE 2 generally illustrates such a "Perfection" burner comprising a low heat conductivity refractory tile or ceramic plate 13 which is perforated by a large number of fine holes 14, there being about 200 holes per square inch. Gas from pipe 15 is metered through orifice 16, passes through air aspirating chamber 17 to a mixing tube and into the burner housing in which sufficient pressure is maintained to feed the mixture through the holes 14. When the mixture is ignited and operating temperatures of the tile are reached, it burns with an evenly distributed pattern typical of surface combustion. The thermal conductivity of refractory plate 13 is so low that the inside surface does not reach the ignition temperature of the gas mixture and thus backfiring in the burner is prevented. The excess air in the products of combustion discharged from the tile aids in rapid combustion of the noxious combustibles passing through the flue.

The infra-red emission from refractory plate 13 may be enhanced and the surface temperature thereof raised without increasing the gas consumption of the burner by placing a large single screen or spaced heat and corrosion resistant metal strip screens 18, for example 10 by 10 mesh Nichrome wire, in front of the refractory plates 13, a distance of from 1/8 inch to 5/8 inch. This feature in combination with a radiant burner is described and claimed in my co-pending application Serial No. 729,153 filed April 17, 1958.

The mechanism of the catalytic oxidation that takes place in this invention can best be explained by distinguishing between the two possible conditions under which gaseous combustion may occur, namely: (1) homogeneously, that is throughout the system as a whole, at temperatures below the ignition point, slowly and without flame, and at temperatures above the ignition point, rapidly and with flame; and (2) heterogeneously, or only in layers immediately in contact with an incandescent surface ("surface" or "catalytic" combustion). The heterogeneous surface combustion provided by burners in this disclosure is a faster, more efficient process than the homogeneous combustion of ordinary flames.

There is abundant evidence that the actual surface combustion is dependent on a prior adsorption of the combustible gas, and possibly also of the oxygen, by the surface. The adsorbed gases become ionized by contact with the hot surface greatly accelerating the oxidation reaction.

The mechanism of the catalytic oxidation that takes place in this invention is not completely understood, as is the case with most catalytic reactions, but the fact that catalysis takes place is evidenced by a comparison of results obtained where the same amount of like combustible materials were wiped across a glass refractory surface of the same area heated to incandescence at the same temperature. The combustible materials passed over the heated glass were not completely oxidized or burned whereas the like combustibles passed over the perforated surfaces of the burner of the present invention at the same temperatures and otherwise like conditions were completely oxidized. Also, it has been found that the catalytic surfaces 12 are self-cleaning because the surface combustion thereon does not allow any residue to accumulate.

It has been found that by supplying an amount of oxygen to the burner 11 in excess of that required to support the flameless surface combustion, it is possible to insure complete combustion of the combustible vapors and particles in the flue gases. The amount of oxygen supplied may be controlled by the size of air inlet orifice 16 with relation to the amount of gas fed to the burner 11, by a premix air-gas unit or by the introduction of additional air into the venturi along with the gas introduced through the orifice and the air aspirated in the air box.

One of the features of the "Perfection" burner is that it operates at the low gas pressure of normal commercial sources making auxiliary means for increasing the gas pressure unnecessary. To prevent creating a back pressure at the catalytic surface 12 by high velocity flue streams that may be present in some installations, a series of alternately staggered baffles 19 are provided in the flue 3 in advance of the burners 11 which serve to reduce the velocity of the flue stream before reaching the catalytic surfaces 12 to a value preventing undue back pressure at the surfaces 12 which might tend to cause the burners to backfire. In installations where flue stream pressures at the surfaces 12 are high, any tendency to create back pressures that may result in backfiring in the burners fed by normal gas pressures may be eliminated by increase of the pressure of gas and air supply. Exposure of the rear surfaces of burners 11 to cooling ambient atmosphere through openings 9 also tends to lower the temperatures of the gas-air mixture in the air chamber and to reduce backfiring tendencies.

In installations where the flue stream contains a high percentage of noncombustible materials, it may be desirable to install scrubbers and precipitators as is well known in the art prior to passage of the combustion products over the catalytic combustion surfaces.

In an embodiment of this invention, combustible fumes that do not contain foreign particles, such as, for example, those evolved from paint drying installations, may be fed into the catalytic combustion burner through the air box 17 along with the air and gas supply. The fumes would then be completely consumed on the surface of the catalytic combustion burner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a flue for the discharge of gases containing combustible components; means in said flue creating a tortuous path for said gases, at least one catalytic gaseous mixture combustion burner mounted in said flue comprising a porous refractory plate adapted to provide substantially flameless surface combustion of the gaseous mixture at a surface temperature of at least 1500° F. and emit intensive infrared heat energy in a predetermined zone; means mounting said burner in said flue in a position such that said plate forms a portion of said tortuous path and projects into said flue to intercept a portion of said gases whereby said combustible components pass through said zone and closely adjacent said refractory plate whereby said combustible materials are substantially completely burned; and means for supplying a mixture of fuel and air to said burner in a ratio to provide substantially flameless combustion at the surface of said refractory plate.

2. The combination of claim 1 in which a metal wire screen capable of withstanding temperatures of at least 1500° F. is mounted in closely spaced relation adjacent the infrared emitting surface of said refractory plate.

3. The combination of claim 1 wherein said means for providing a tortuous path includes baffles in said flue in advance of said catalytic combustion burner to retard the flow of said combustible materials before they reach the region of said catalytic combustion burner.

4. In combination, a flue for the discharge of gases containing combustible materials; a plurality of catalytic gaseous mixture combustion burners mounted in said flue; said catalytic combustion burners each having a porous refractory plate adapted to provide substantially flameless surface combustion of the gaseous mixture at a surface temperature of at least 1500° F. and emit intensive infrared heat energy in a predetermined zone; said catalytic combustion burners being so positioned in the flue that the refractory plates and flue walls provide a tortuous fluid passageway for combustible materials passing through the flue whereby the combustible materials passing through the zone of infrared energy are substantially completely burned; and means for supplying a mixture of fuel and air to said burners in a ratio to provide substantially flameless combustion.

5. In combination, a flue for the discharge of gases containing combustible materials, a plurality of gaseous mixture burners, said burners each having a porous plate adapted to provide substantially flameless surface combustion of a gaseous mixture at a surface temperature of at least 1500° F. and emit intensive infra-red heat energy in a predetermined zone, means mounting said burners in said flue so that said porous plates form portions of the walls of said flue, said plates and the remainder of said walls providing a tortuous path for said combustible materials passing through said flue, said plates being inclined with respect to the axis of said flue whereby portions of said combustible materials are intercepted by said plates and sweep across the surface of said plates, and said burners being axially offset along said flue whereby the portions of said combustible materials sweeping across the face of one plate is also exposed to the radiation from the next adjacent plate, and means for supplying a mixture of fuel and air to said burners in a ratio to provide substantially flameless combustion.

References Cited in the file of this patent

UNITED STATES PATENTS

| | | |
|---|---|---|
| 146,369 | Stover | Jan. 13, 1874 |
| 1,901,086 | Cox | Mar. 14, 1933 |
| 2,121,733 | Cottrell | June 21, 1938 |
| 2,658,742 | Suter et al. | Nov. 10, 1953 |
| 2,752,870 | Short et al. | July 3, 1956 |
| 2,770,318 | Triggs | Nov. 13, 1956 |
| 2,845,882 | Bratton | Aug. 5, 1958 |
| 2,870,830 | Schwank | Jan. 27, 1959 |

FOREIGN PATENTS

| | | |
|---|---|---|
| 1,136,769 | France | Jan. 7, 1957 |
| 325,568 | Great Britain | Feb. 20, 1930 |
| 494,087 | Great Britain | Oct. 17, 1938 |